(12) United States Patent
Cho et al.

(10) Patent No.: US 11,427,056 B2
(45) Date of Patent: Aug. 30, 2022

(54) BOARDING/DEBOARDING SUPPORT STRUCTURE FOR LOWER DOOR

(71) Applicants: Hyundai Motor Company, Seoul (KR); Kia Motors Corporation, Seoul (KR)

(72) Inventors: Ki Hyun Cho, Hwaseong-si (KR); Eui Chan Cho, Suwon-si (KR); Sudhir Rampalli, Hyderabad (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 16/984,460

(22) Filed: Aug. 4, 2020

(65) Prior Publication Data
US 2021/0170844 A1  Jun. 10, 2021

(30) Foreign Application Priority Data

Dec. 6, 2019 (KR) .................. 10-2019-0161211

(51) Int. Cl.
| | |
|---|---|
| *B60J 5/10* | (2006.01) |
| *B60R 13/02* | (2006.01) |
| *B62D 33/03* | (2006.01) |
| *B62D 25/20* | (2006.01) |

(52) U.S. Cl.
CPC ........... *B60J 5/108* (2013.01); *B60R 13/0243* (2013.01); *B62D 25/2027* (2013.01); *B62D 33/03* (2013.01)

(58) Field of Classification Search
CPC .. B60J 5/108; B60R 13/0243; B62D 25/2027; B62D 33/03

USPC .................. 296/57.1, 65.04, 146.8; 414/921
See application file for complete search history.

(56) References Cited

U.S. PATENT DOCUMENTS

| | | | | | |
|---|---|---|---|---|---|
| 3,874,527 | A | * | 4/1975 | Royce .................... | A61G 3/061 414/537 |
| 4,155,468 | A | * | 5/1979 | Royce .................... | A61G 3/061 414/556 |
| 4,877,226 | A | * | 10/1989 | Taylor ...................... | F16F 5/00 267/196 |
| 5,188,415 | A | * | 2/1993 | Wagner .............. | B62D 33/0273 296/57.1 |
| 5,904,391 | A | * | 5/1999 | Liljenquest ........ | B62D 33/0273 296/57.1 |

(Continued)

FOREIGN PATENT DOCUMENTS

KR  100383943 B1  5/2003

*Primary Examiner* — Joseph D. Pape
*Assistant Examiner* — Veronica M Shull
(74) *Attorney, Agent, or Firm* — Slater Matsil, LLP (57) ABSTRACT

A boarding/deboarding support structure includes a lower door having an upper end configured to be rotated and opened with respect to a bottom surface of a vehicle body, a lower trim located inside the lower door, the lower trim having an upper end configured to be rotated and opened with respect to a floor of the vehicle body, and an absorbing member having at least a portion supported by the lower door and a rear surface of the lower trim, the absorbing member being configured to absorb energy, wherein the lower trim is located between the floor of the vehicle body and an inner surface of the lower door, and wherein, when the lower door is opened, the absorbing member is deployed to be located between the lower trim and the lower door.

20 Claims, 8 Drawing Sheets

(56) References Cited

U.S. PATENT DOCUMENTS

| | | | | |
|---|---|---|---|---|
| 8,459,716 B2* | 6/2013 | Kaplan | ............ | B62D 33/0273 |
| | | | | 296/57.1 |
| 8,870,269 B2* | 10/2014 | Serpeault | ............... | F41H 5/226 |
| | | | | 296/187.07 |
| 10,682,970 B2* | 6/2020 | Gheorghe | ............... | B60R 19/20 |
| 2007/0057525 A1* | 3/2007 | Yui | ........................ | E05D 5/062 |
| | | | | 296/55 |
| 2009/0243329 A1* | 10/2009 | Hustyi | .................... | B60J 5/103 |
| | | | | 296/76 |
| 2011/0291338 A1* | 12/2011 | Pepka | ................... | B60G 11/14 |
| | | | | 267/225 |
| 2015/0061319 A1* | 3/2015 | Johnson | ............ | B62D 33/0273 |
| | | | | 296/183.1 |
| 2015/0084361 A1* | 3/2015 | McDermott, III | . | B62D 33/0273 |
| | | | | 296/57.1 |
| 2018/0170163 A1* | 6/2018 | Masumoto | ............... | B60J 10/86 |

* cited by examiner

BOARDING/DEBOARDING SUPPORT STRUCTURE FOR LOWER DOOR

CROSS-REFERENCE TO RELATED APPLICATIONS

This application claims the benefit of Korean Patent Application No. 10-2019-0161211, filed on Dec. 6, 2019, which application is hereby incorporated herein by reference.

TECHNICAL FIELD

The present disclosure relates to a boarding/deboarding support structure for a lower door.

BACKGROUND

In general, a tailgate is an opening/closing door that is installed at the rear end of a wagon-type vehicle, a van, a recreational vehicle, or the like in order to load cargo into the rear portion of the vehicle body.

A tailgate is installed to facilitate access by a driver to a cargo compartment formed in the cabin of the vehicle. A tailgate installed at the rear end of the vehicle enables not only convenient loading and unloading of cargo into and out of a cargo compartment but also boarding and deboarding of passengers through the rear portion of the vehicle.

Further, in the case of a vehicle in which tailgates may be mounted not only to the rear portion of the vehicle but also to the front portion of the vehicle, loading and unloading of cargo and boarding and deboarding of passengers through both the front portion and the rear portion of the vehicle may be enabled. In this case, there is the need for a flat boarding/deboarding support plate for securing the convenience of passengers and a structure for supporting the weight of the passengers.

Meanwhile, a bumper may be disposed on the lower end of a tailgate to absorb impacts occurring in the event of a collision of a vehicle. However, since there is a limitation on the extent to which the bumper can absorb impacts, there is the need to devise a separate structure for minimizing an impact load.

The above information disclosed in this Background section is only for enhancement of understanding of the background of the disclosure and therefore it may contain information that does not form the related art that is already known to a person of ordinary skill in the art.

Korean Patent Registration No. 10-0383943 discloses subject matter that is related to subject matter disclosed herein.

SUMMARY OF THE DISCLOSURE

The present disclosure relates to a boarding/deboarding support structure for a lower door. Particular embodiments relate to a boarding/deboarding support structure for a lower door, which is capable of stably supporting a load when an occupant gets into or out of a vehicle through the door and minimizing injury to the occupant and damage to the vehicle in the event of a collision of the vehicle.

The present disclosure solves problems associated with the related art, and an embodiment of the present disclosure provides a boarding/deboarding support structure for a lower door, which includes a lower trim provided inside a lower door and an energy-absorbing member configured to be deployed when the lower door is opened.

Another embodiment of the present disclosure provides a boarding/deboarding support structure for a lower door, which is configured such that an energy-absorbing member operates in conjunction with opening and closing of a lower door due to the elastic force of a torsion spring and a compression spring.

The features of the present disclosure are not limited to the above-mentioned features, and other features not mentioned herein will be clearly understood by those skilled in the art from the following description, and will become apparent with reference to the embodiments of the present disclosure. In addition, the features of the present disclosure can be accomplished by the components described in the appended claims and combinations thereof.

A boarding/deboarding support structure for a lower door for achieving the features of the present disclosure includes the following configurations.

In one aspect, the present disclosure provides a boarding/deboarding support structure for a lower door, the boarding/deboarding support structure including a lower door configured such that the upper end thereof is rotated and opened with respect to the bottom surface of the vehicle body, a lower trim located inside the lower door, the lower trim being configured such that the upper end thereof is rotated and opened with respect to the floor of the vehicle body, and a first absorbing member configured such that at least a portion thereof is supported by the lower door and the rear surface of the lower trim, the first absorbing member being configured to absorb energy, wherein the lower trim is located between the floor of the vehicle body and the inner surface of the lower door, and when the lower door is opened, the first absorbing member is deployed to be located between the lower trim and the lower door.

In a preferred embodiment, the lower door may be provided with a first hinge part connected to the bottom surface of the vehicle body, the lower trim may be provided with a second hinge part connected to the floor of the vehicle body, and the second hinge part may be formed to be higher than the first hinge part in the height direction of the vehicle body.

In another preferred embodiment, the boarding/deboarding support structure may further include a first reinforcing member connected to the floor of the vehicle body, and the second hinge part may be connected to the first reinforcing member such that the lower trim is rotated and opened.

In still another preferred embodiment, the first absorbing member may further include a torsion spring having elastic force, and when the lower door is in the closed state, the first absorbing member may be pressed, and the torsion spring may be compressed.

In yet another preferred embodiment, when the lower door is opened, the first absorbing member may be deployed by the restoring force of the torsion spring.

In still yet another preferred embodiment, when the lower door is fully opened, the torsion spring may be restored, and the first absorbing member may be deployed such that one end of the first absorbing member contacts the inner end of the lower door.

In another aspect, the present disclosure provides a boarding/deboarding support structure for a lower door, the boarding/deboarding support structure including a lower door configured such that the upper end thereof is rotated and opened with respect to the bottom surface of the vehicle body, a lower trim located inside the lower door, the lower trim being configured such that the upper end thereof is rotated and opened with respect to the floor of the vehicle body, a second absorbing member configured such that at least a portion thereof is supported by the lower door and the rear surface of the lower trim, the second absorbing member being configured to absorb energy, and a compression spring located inside the second absorbing member, wherein the lower trim is located between the floor of the vehicle body and the inner surface of the lower door, and when the lower door is opened, the second absorbing member is deployed to be located between the lower trim and the lower door.

In a preferred embodiment, the lower door may be provided with a first hinge part connected to the bottom surface of the vehicle body, the lower trim may be provided with a second hinge part connected to the floor of the vehicle body, and the second hinge part may be formed to be higher than the first hinge part in the height direction of the vehicle body.

In another preferred embodiment, the boarding/deboarding support structure may further include a third absorbing member provided at the inner-lower end of the lower door to absorb energy, and a second reinforcing member located adjacent to the third absorbing member in the width direction of the vehicle body. When the lower door is opened, the third absorbing member may be rotated integrally therewith.

In still another preferred embodiment, the boarding/deboarding support structure may further include a stiffener beam configured to penetrate the third absorbing member, and a weather strip located at one end of the second reinforcing member so as to be opposite the lower door. The second hinge part may be connected to the second reinforcing member such that the lower trim is rotated and opened.

In yet another preferred embodiment, the compression spring may be configured to be fully compressed to absorb vibration when the lower door is in the closed state.

In still yet another preferred embodiment, when the lower door is opened, the second absorbing member may be deployed by the restoring force of the compression spring.

In a further preferred embodiment, when the lower door is in the fully opened state, the compression spring may be restored, one end of the second absorbing member may be in contact with the inner end of the lower door, and the opposite end of the second absorbing member may be in contact with a support portion of the third absorbing member.

In another further preferred embodiment, when the lower door is in the closed state, one end of the third absorbing member may be in contact with the second reinforcing member, and the opposite end of the third absorbing member may be in contact with an inner panel of the lower door to absorb a collision.

In still another further preferred embodiment, the stiffener beam may be configured to withstand a load and collision energy transferred to the third absorbing member.

In yet another further preferred embodiment, when the lower door is in the fully opened state, the second absorbing member may be in contact with the support portion of one end of the third absorbing member, and the opposite end of the third absorbing member may be in contact with the inner panel of the lower door to support a load.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be more thorough and complete, and will more fully convey the scope of the disclosure to those skilled in the art.

The terms "part", "unit", and "member" used in the specification mean units for processing at least one function or operation, and may be implemented using hardware components, software components, or combinations thereof.

Further, the term "door" used in the specification includes a door configured to open in a forward-backward direction of a vehicle and doors configured to open bilaterally in a width direction of the vehicle, and the following description in the specification will focus on one end of a door configured to open in the forward-backward direction of the vehicle.

Figure 1:
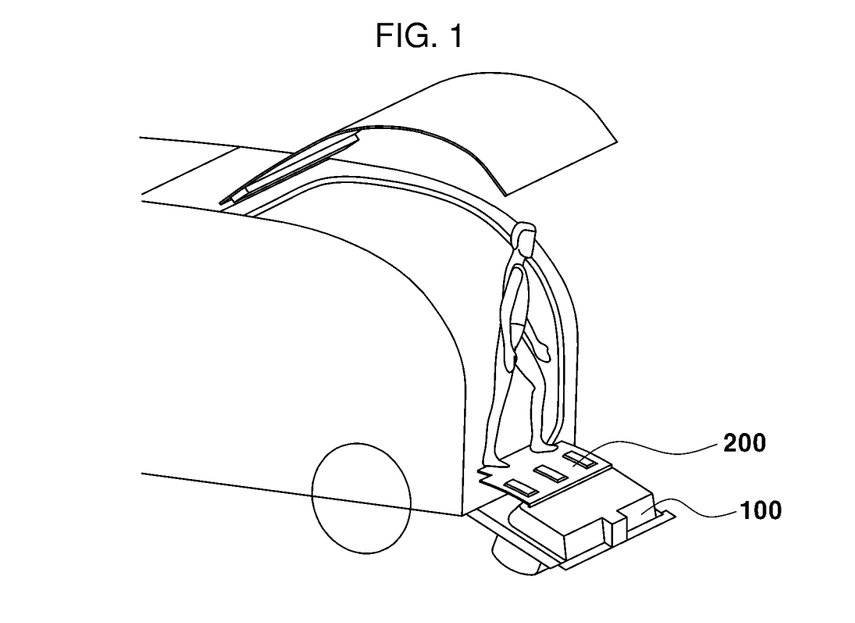
FIG. 1 is a view illustrating the opened state of a lower door having a boarding/deboarding support structure therefor according to an embodiment of the present disclosure.
Figure 2:
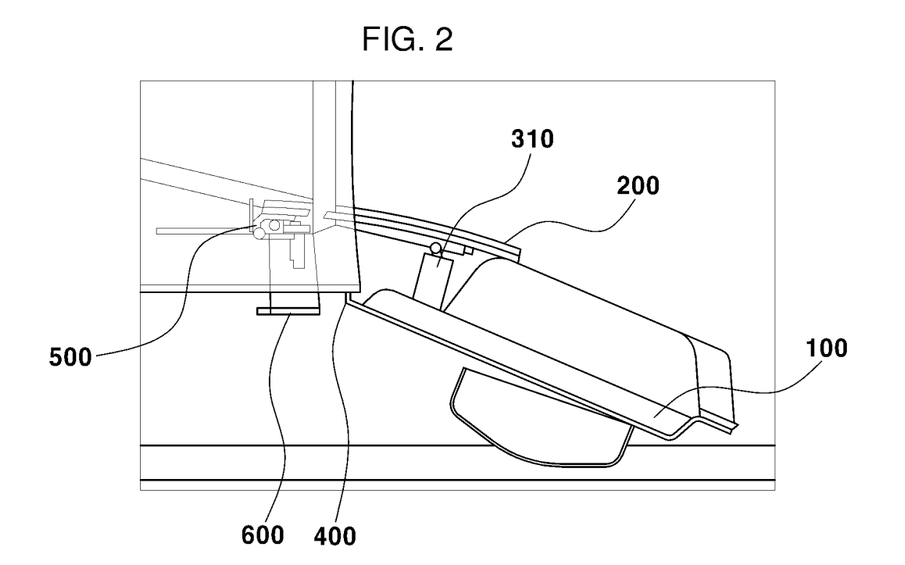
FIG. 2 is a side view illustrating the opened state of the lower door having the boarding/deboarding support structure therefor according to an embodiment of the present disclosure.

FIG. 1 is a view illustrating an opened state of a lower door having a boarding/deboarding support structure therefor according to an embodiment of the present disclosure, and FIG. 2 is a side view illustrating the opened state of the lower door having the boarding/deboarding support structure therefor according to an embodiment of the present disclosure.

Referring to FIGS. 1 and 2, the boarding/deboarding support structure for a lower door according to an embodiment of the present disclosure may include a lower door 100 configured such that the upper end thereof is rotated and opened with respect to the bottom surface of the vehicle body, a lower trim 200 located inside the lower door 100 and configured such that the upper end thereof is rotated and opened with respect to the floor of the vehicle body, and an absorbing member 310 configured such that at least a portion thereof is supported by the lower door 100 and the rear surface of the lower trim 200 and configured to absorb energy. The lower trim 200 may be located between the floor of the vehicle body and the inner surface of the lower door 100. When the lower door 100 is opened, the absorbing member 310 may be deployed to be located between the lower trim 200 and the lower door 100.

In addition, the lower door 100 may be provided with a first hinge part 400, which is connected to the bottom surface of the vehicle body, and the lower trim 200 may be provided with a second hinge part 500, which is connected to the floor of the vehicle body. The second hinge part 500 may be formed to be higher than the first hinge part 400 in the height direction of the vehicle body. In addition, the boarding/deboarding support structure for a lower door may further include a first reinforcing member 600, which is connected to the floor of the vehicle body. The second hinge part 500 may be connected to the first reinforcing member 600 such that the lower trim 200 is rotated and opened.

The door may include an upper door, which is configured such that, with respect to one end thereof, which is adjacent to the roof of the vehicle, the opposite end thereof, which is close to the rear portion of the vehicle, is rotated and opened in the height direction, and the lower door 100, which is provided adjacent to the opposite end of the upper door. The upper end of the lower door 100 may be rotated and opened with respect to the bottom surface of the vehicle body.

The lower door 100 may be opened by driving force applied thereto by a driving unit. When the lower door 100 is fully opened, an occupant may get into or out of the vehicle therethrough. More preferably, when an occupant gets into or out of the vehicle, a garnish located on one surface of the lower door 100 may come into contact with the external ground, thereby securing support stability.

The lower trim 200 may be located inside the lower door 100. More preferably, the inner surface of the lower door 100 may have a bent shape, and the lower trim 200 may cover the gap between the floor of the vehicle body and the lower door 100.

The lower trim 200 may be made of a reinforced plastic material in order to sufficiently support the load applied thereto by an occupant. Further, in order to prevent damage attributable to repetitive collisions and contact, the lower trim 200 may be made of high strength steel (HSS) or advanced high strength steel (AHSS). AHSS may conceptually include ultra HSS (UHSS). However, the present disclosure is not limited as to the specific material of the lower trim 200.

The lower trim 200 may extend in the width direction of the vehicle. More preferably, the lower trim 200 may have a flat plate shape that corresponds to the width of the floor of the vehicle body. Further, in order to prevent an occupant from slipping when getting into or out of the vehicle, the surface of the lower trim 200 that is touched by the feet of the occupant may be formed to be uneven. The rear surface of the lower trim 200 may be formed to be even such that the absorbing member 310 is stably coupled thereto.

The lower trim 200 may be configured such that the upper end thereof is rotated and opened with respect to the floor of the vehicle body. More preferably, the lower trim 200 is located between the floor of the vehicle body and the inner surface of the lower door 100. The second hinge part 500, which is connected to the floor of the vehicle body, may be provided at the lower trim 200 together with a return spring. The lower door 100 may be provided with the first hinge part 400, which is connected to the bottom surface of the vehicle body. In this case, the second hinge part 500 may be formed to be higher than the first hinge part 400 in the height direction of the vehicle body. Thus, when the upper end of the lower door 100 is rotated and opened, the upper end of the lower trim 200 may be rotated and opened integrally therewith by the return spring of the second hinge part 500.

The boarding/deboarding support structure for a lower door according to an embodiment of the present disclosure may include the absorbing member 310, which is configured such that at least a portion thereof is supported by the lower door 100 and the rear surface of the lower trim 200 and is configured to absorb energy. When the lower door 100 is opened, the absorbing member 310 may be deployed to be located between the lower trim 200 and the lower door 100.

The absorbing member 310 may have a rectangular parallelepiped shape, and may be provided in a plural number on the rear surface of the lower trim 200 such that each of the plurality of absorbing members 310 are spaced apart from each other. More preferably, one absorbing member 310 may be provided on the center in the width direction of the lower trim 200, and each of two absorbing members 310 may be provided on a respective one of the two opposite side portions of the lower trim 200, thereby supporting the weight of an occupant in a distributed manner and absorbing collision energy in a distributed manner.

The absorbing member 310 may be made of a synthetic resin material. More preferably, the absorbing member 310 may be made of polyvinyl chloride (PVC) in order to flexibly absorb collision energy. However, the present disclosure is not limited as to the specific material of the absorbing member 310, so long as the absorbing member 310 is made of a material having properties equivalent to those of PVC.

The absorbing member 310 may be configured such that at least a portion thereof is supported by the lower door 100 and the rear surface of the lower trim 200. More preferably, when an occupant gets into or out of the vehicle through the lower trim 200, the absorbing member 310 may fill the gap between the lower trim 200 and the lower door 100. Accordingly, when an occupant gets into or out of the vehicle through the opened lower door 100, the absorbing member 310 may stably support a load.

In addition, in the event of a collision of the vehicle in the state in which the lower door 100 is closed, impact energy may be effectively absorbed and alleviated by the absorbing member 310, which fills the gap between the lower trim 200 and the lower door 100, thereby preventing damage to the vehicle and ensuring the occupants' safety.

The boarding/deboarding support structure for a lower door according to an embodiment of the present disclosure may further include the first reinforcing member 600, which is connected to the floor of the vehicle body. The second hinge part 500 may be connected to the first reinforcing member 600 to enable the lower trim 200 to be rotated and opened.

The first reinforcing member 600 may be provided on the floor of the vehicle body so as to extend in the width direction of the vehicle. The second hinge part 500 may be bolted to one end of the first reinforcing member 600 so as to enable the lower trim 200 to be rotated and opened. More preferably, the second hinge part 500 may be connected to each of the two opposite sides of the lower end of the lower trim 200. Accordingly, when the lower door 100 is opened, the lower trim 200 may be opened integrally therewith.

Figure 3:
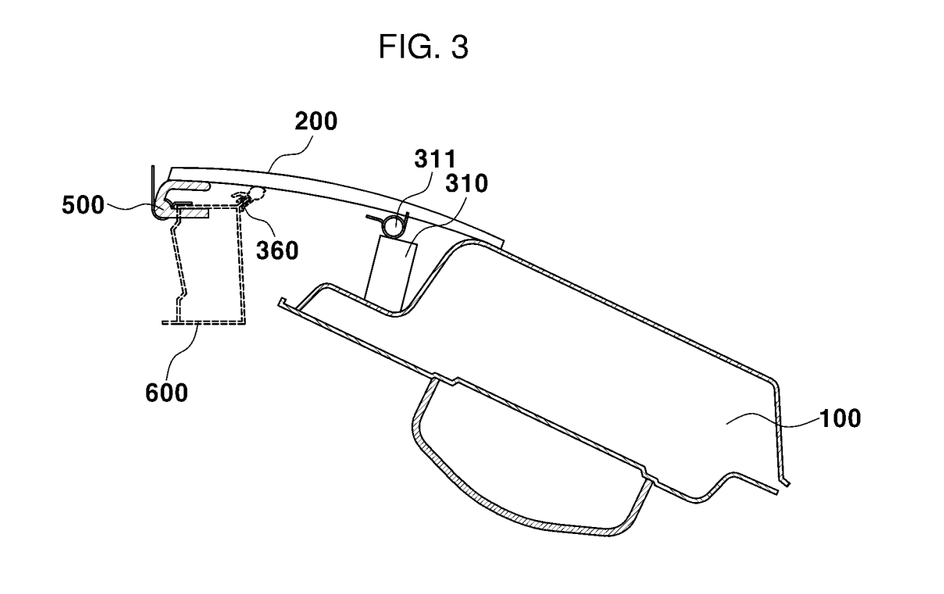
FIG. 3 is a side cross-sectional view illustrating the opened state of the lower door of the boarding/deboarding support structure therefor according to an embodiment of the present disclosure.

FIG. 3 is a side cross-sectional view illustrating the opened state of the lower door 100 of the boarding/deboarding support structure therefor according to an embodiment of the present disclosure.

Referring to FIG. 3, in the boarding/deboarding support structure for a lower door according to an embodiment of the present disclosure, the absorbing member 310 may further include a torsion spring 311 having elastic force. When the lower door 100 is opened, the absorbing member 310 may be deployed by the restoring force of the torsion spring 311. Further, when the lower door 100 is fully opened, the torsion spring 311 may be restored, and the absorbing member 310 may be deployed such that one end of the absorbing member 310 contacts the inner end of the lower door 100.

The torsion spring 311 may be connected to one end of the absorbing member 310. More preferably, in order to allow one end of the absorbing member 310 to rotate, the torsion spring 311 may be provided at the opposite end of the absorbing member 310, which is connected to the rear surface of the lower trim 200.

The torsion spring 311 may have elastic force. When the lower door 100 is in the opened state, the torsion spring 311 may not receive compressive force. When the lower door 100 is closed and thus the absorbing member 310 is rotated and pressed, the torsion spring 311 may receive compressive force.

When the lower door 100 is opened from the closed state, the absorbing member 310 may be rotated and deployed by the restoring force of the torsion spring 311. More preferably, the restoring force of the torsion spring 311 may be applied to one end of the absorbing member 310, and the one end of the absorbing member 310 may be rotated and deployed.

When the lower door 100 is fully opened, the torsion spring 311 may be fully restored, and the absorbing member 310 may be deployed such that one end of the absorbing member 310 contacts the inner end of the lower door 100. More preferably, when the one end of the absorbing member 310 that is rotated and deployed comes into contact with the inner end of the lower door 100, the one end of the absorbing member 310 may not be deployed any further.

The opposite end of the absorbing member 310 may be in contact with the rear surface of the lower trim 200 via the torsion spring 311, and one end of the absorbing member 310 may be supported by the inner end of the lower door 100, thereby stably filling the gap between the lower trim 200 and the lower door 100.

Figure 4:
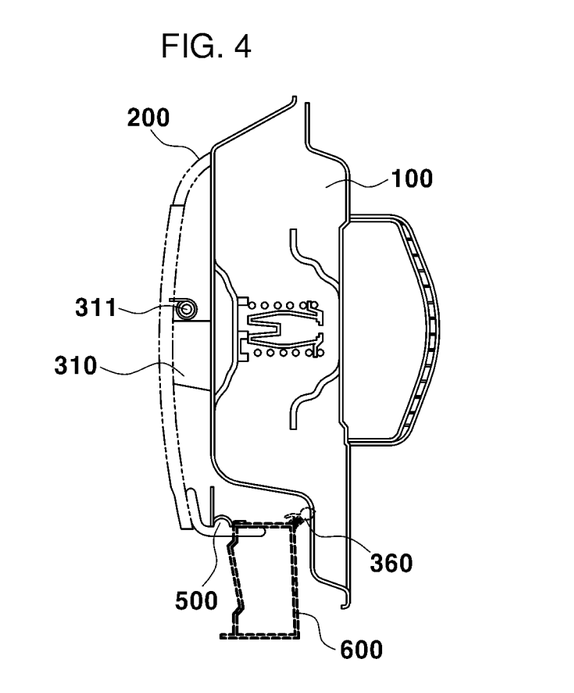
FIG. 4 is a side cross-sectional view illustrating the closed state of the lower door of the boarding/deboarding support structure therefor according to an embodiment of the present disclosure.

FIG. 4 is a side cross-sectional view illustrating the closed state of the lower door 100 of the boarding/deboarding support structure therefor according to an embodiment of the present disclosure.

Referring to FIG. 4, in the boarding/deboarding support structure for a lower door according to an embodiment of the present disclosure, when the lower door 100 is in the closed state, the absorbing member 310 may be pressed, and the torsion spring 311 may be compressed.

When the lower door 100 is closed, the inner end of the lower door 100 may push one end of the absorbing member 310, and thus the absorbing member 310 may be pressed. More preferably, one end of the absorbing member 310, which is in contact with the inner end of the lower door 100 in the state in which the lower door 100 is opened, may be caught and rotated to be pressed by the inner surface of the lower door 100 when the lower door 100 is closed.

When the lower door 100 is in the closed state, the absorbing member 310 may be located between the lower trim 200 and the lower door 100, and may absorb external impacts. More preferably, the absorbing member 310 may be located in the gap between the lower trim 200 and the lower door 100, thereby alleviating impacts in the event of a collision of the vehicle.

Figure 5:
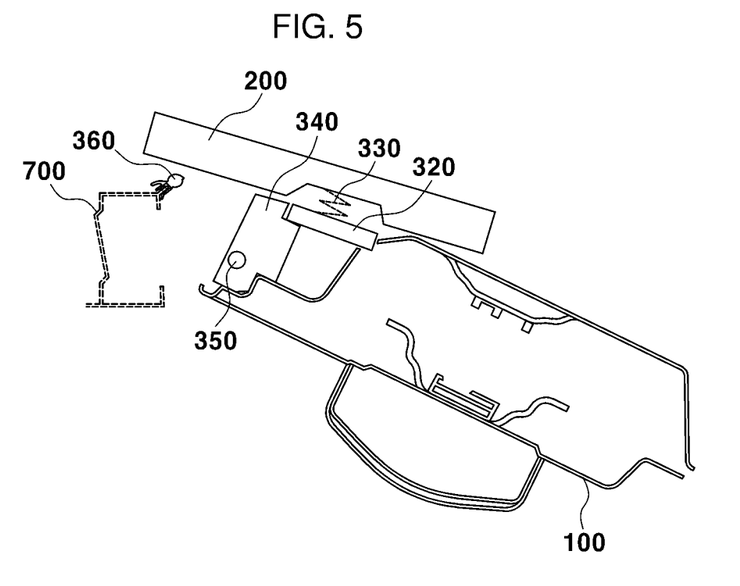
FIG. 5 is a side cross-sectional view illustrating the opened state of the lower door of a boarding/deboarding support structure therefor according to another embodiment of the present disclosure.
Figure 6:
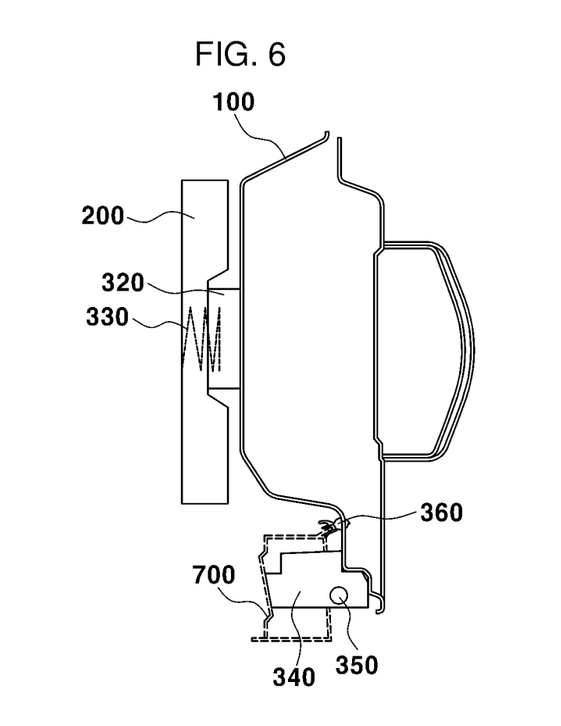
FIG. 6 is a side cross-sectional view illustrating the closed state of the lower door of the boarding/deboarding support structure therefor according to another embodiment of the present disclosure.

FIG. 5 is a side cross-sectional view illustrating the opened state of the lower door 100 of a boarding/deboarding support structure therefor according to another embodiment of the present disclosure, and FIG. 6 is a side cross-sectional view illustrating the closed state of the lower door 100 of the boarding/deboarding support structure therefor according to another embodiment of the present disclosure.

The boarding/deboarding support structure for a lower door according to another embodiment of the present disclosure may include a lower door 100 configured such that the upper end thereof is rotated and opened with respect to the bottom surface of the vehicle body, a lower trim 200 located inside the lower door 100 and configured such that the upper end thereof is rotated and opened with respect to the floor of the vehicle body, a first absorbing member 320 configured such that at least a portion thereof is supported by the lower door 100 and the rear surface of the lower trim 200 and configured to absorb energy, and a compression spring 330 located inside the first absorbing member 320. The lower trim 200 may be located between the floor of the vehicle body and the inner surface of the lower door 100. When the lower door 100 is opened, the first absorbing member 320 may be deployed to be located between the lower trim 200 and the lower door 100.

In addition, the lower door 100 may be provided with a first hinge part 400, which is connected to the bottom surface of the vehicle body, and the lower trim 200 may be provided with a second hinge part 500, which is connected to the floor of the vehicle body. The second hinge part 500 may be formed to be higher than the first hinge part 400 in the height direction of the vehicle body.

The first absorbing member 320 may be formed such that at least a portion thereof is supported by the lower door 100 and the rear surface of the lower trim 200. The first absorbing member 320 may have a rectangular parallelepiped shape, and may be provided in a plural number on the rear surface of the lower trim 200 such that each of the plurality of second absorbing members 320 are spaced apart from each other. More preferably, one first absorbing member 320 may be provided on the center in the width direction of the lower trim 200, and each of two second absorbing members 320 may be provided on a respective one of the two opposite side portions of the lower trim 200, thereby supporting the weight of an occupant in a distributed manner and absorbing collision energy in a distributed manner.

The first absorbing member 320 may be made of a synthetic resin material. More preferably, the first absorbing member 320 may be made of polyvinyl chloride (PVC) in order to flexibly absorb collision energy. However, the present disclosure is not limited as to the specific material of the first absorbing member 320, so long as the first absorbing member 320 is made of a material having properties equivalent to those of PVC.

When an occupant gets into or out of the vehicle through the lower trim 200, the first absorbing member 320 may fill the gap between the lower trim 200 and the lower door 100. Accordingly, when an occupant gets into or out of the vehicle through the opened lower door 100, the first absorbing member 320 may stably support a load.

In addition, in the event of a collision of the vehicle in the state in which the lower door 100 is closed, impact energy may be effectively absorbed and alleviated by the first absorbing member 320, which fills the gap between the lower trim 200 and the lower door 100, thereby preventing damage to the vehicle and ensuring the occupants' safety.

The compression spring 330 may be provided inside the first absorbing member 320. The compression spring 330 may have elastic force. When the lower door 100 is in the opened state, the compression spring 330 may not receive compressive force. When the lower door 100 is closed and thus the first absorbing member 320 is pressed, the compression spring 330 may receive compressive force.

When the lower door wo is opened from the closed state, the first absorbing member 320 may be deployed by the restoring force of the compression spring 330. More preferably, the restoring force of the compression spring 330 may be applied to one surface of the first absorbing member 320, and the one surface of the first absorbing member 320 may be deployed.

When the lower door 100 is fully opened, the compression spring 330 may be fully restored, and the first absorbing member 320 may be deployed. In this case, one end of the first absorbing member 320 may contact the inner end of the lower door 100. More preferably, when the one end of the first absorbing member 320 that is deployed comes into contact with the inner end of the lower door 100, the first absorbing member 320 may not be deployed any further.

The boarding/deboarding support structure for a lower door according to another embodiment of the present disclosure may further include a second absorbing member 340, which is provided at the inner-lower end of the lower door 100 to absorb energy, and a second reinforcing member 700, which is located adjacent to the second absorbing member 340 in the width direction of the vehicle. When the lower door 100 is opened, the second absorbing member 340 may be rotated integrally therewith.

The second absorbing member 340 may be provided in a plural number, and the plurality of third absorbing members 340 may be located at positions corresponding to the plurality of second absorbing members 320 in the width direction of the vehicle body so as to be spaced apart from each other. More preferably, the second absorbing member 340 may have a support portion formed in one end thereof, on which the first absorbing member 320 is seated, and the opposite end of the second absorbing member 340 may have a shape corresponding to a curved portion of the inner-lower end of the lower door 100.

The second absorbing member 340 may be made of a synthetic resin material. More preferably, the second absorbing member 340 may be made of polyvinyl chloride (PVC) in order to flexibly absorb collision energy. However, the present disclosure is not limited as to the specific material of the second absorbing member 340, so long as the second absorbing member 340 is made of a material having properties equivalent to those of PVC.

When the lower door 100 is opened, the second absorbing member 340 may be rotated integrally therewith, and one end of the second absorbing member 340 may contact the lower trim 200 and the first absorbing member 320. Accordingly, the second absorbing member 340 may fill the gap between the lower door 100 and the lower trim 200, thereby stably supporting a load when an occupant gets into or out of the vehicle.

When the lower door 100 is in the fully opened state, one end of the first absorbing member 320 may be in contact with the inner end of the lower door 100, and the opposite end of the first absorbing member 320 may be in contact with the support portion of the second absorbing member 340. The second absorbing member 340 may support a load in conjunction with the first absorbing member 320 and the compression spring 330.

The second reinforcing member 700 may be located adjacent to the second absorbing member 340 in the width direction of the vehicle. The second reinforcing member 700 may be connected to the floor of the vehicle body. When the lower door 100 is closed, the second reinforcing member 700 may support one end of the second absorbing member 340 in order to withstand a collision with an external object.

The boarding/deboarding support structure for a lower door according to another embodiment of the present disclosure may further include a stiffener beam 350, which penetrates the second absorbing member 340, and a weather strip 360, which is located at one end of the second reinforcing member 700 and is opposite the lower door 100. The second hinge part 500 may be connected to the second reinforcing member 700 such that the lower trim 200 is rotated and opened.

The stiffener beam 350 may extend so as to penetrate the second absorbing member 340 in the width direction of the vehicle. A carbon steel tube for machine structural purposes (STKM) may be used as the stiffener beam 350. The stiffener beam 350 may efficiently withstand a collision and support a load together with the second absorbing member 340. More preferably, the stiffener beam 350 may be configured to withstand a load and collision energy transferred to the second absorbing member 340.

Figure 7:
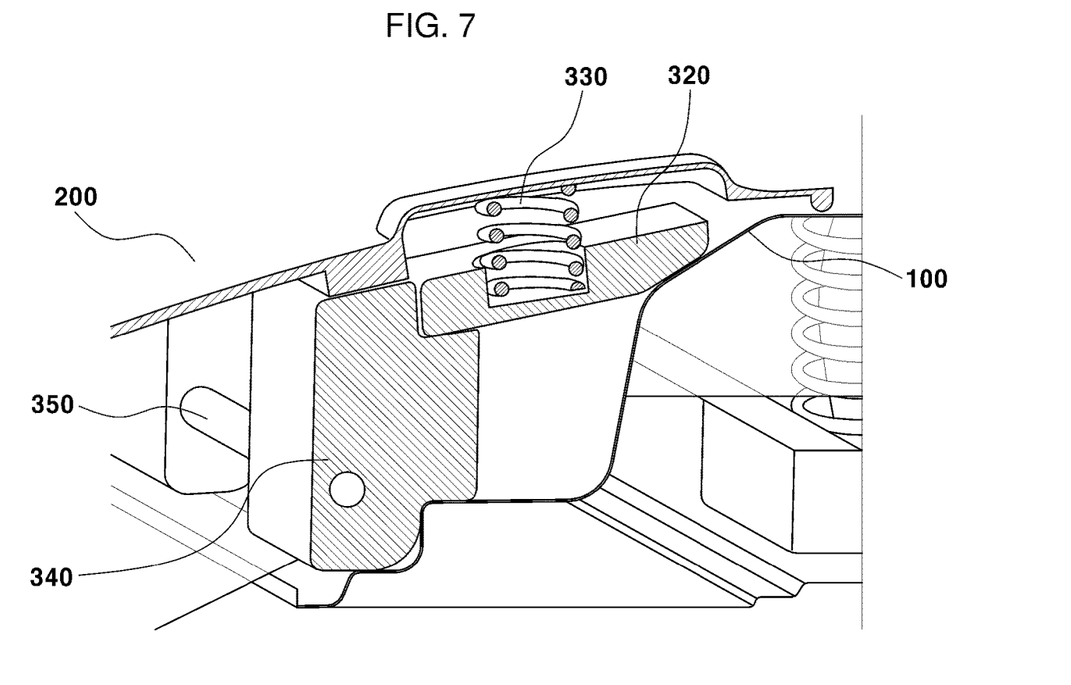
FIG. 7 is a view illustrating a second absorbing member of the boarding/deboarding support structure for a lower door according to another embodiment of the present disclosure when the lower door is in the opened state.
Figure 8:
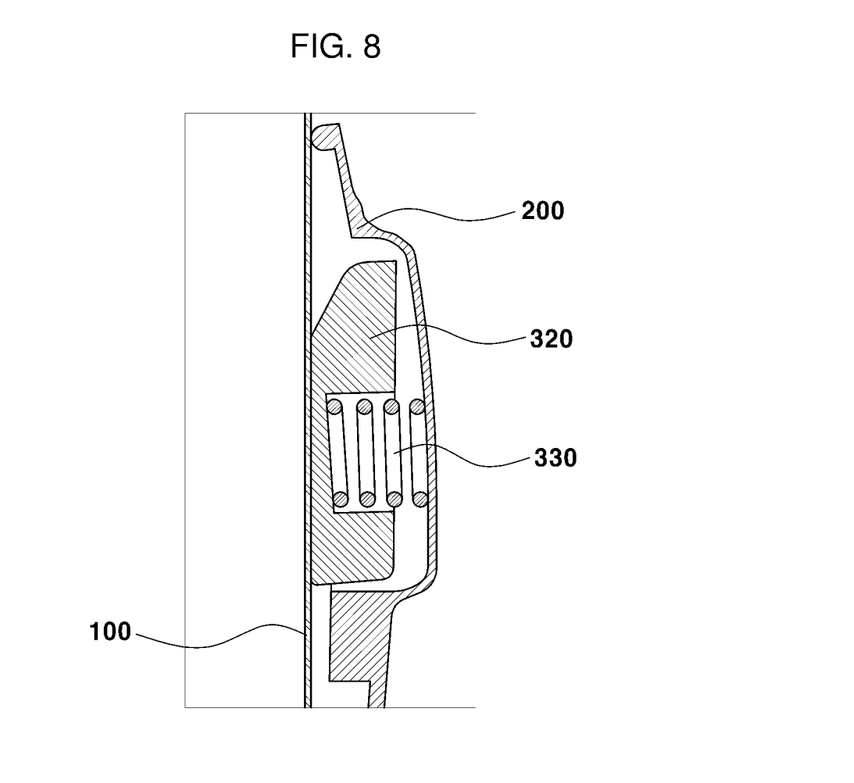
FIG. 8 is a view illustrating the second absorbing member of the boarding/deboarding support structure for a lower door according to another embodiment of the present disclosure when the lower door is in the closed state.

FIG. 7 is a view illustrating the first absorbing member 320 of the boarding/deboarding support structure for a lower door according to another embodiment of the present disclosure when the lower door 100 is in the opened state, and FIG. 8 is a view illustrating the first absorbing member 320 of the boarding/deboarding support structure for a lower door according to another embodiment of the present disclosure when the lower door 100 is in the closed state.

Referring to FIG. 7, when the lower door 100 is in the fully opened state, one end of the first absorbing member 320 may be in contact with the inner end of the lower door 100, and the opposite end of the first absorbing member 320 may be in contact with the support portion of the second absorbing member 340. When an occupant gets into or out of the vehicle, a load may be applied from the lower trim 200 to the compression spring 330 and the first absorbing member 320, and the first absorbing member 320 may be supported by the lower door 100 and the second absorbing member 340.

Referring to FIG. 8, the compression spring 330 may be configured to be fully compressed to absorb vibration when the lower door 100 is in the closed state. More preferably, one end of the compression spring 330 may be in contact with the first absorbing member 320, and the opposite end of the compression spring 330 may be in contact with the rear surface of the lower trim 200, thereby absorbing a collision with an external object or vibration.

Figure 9:
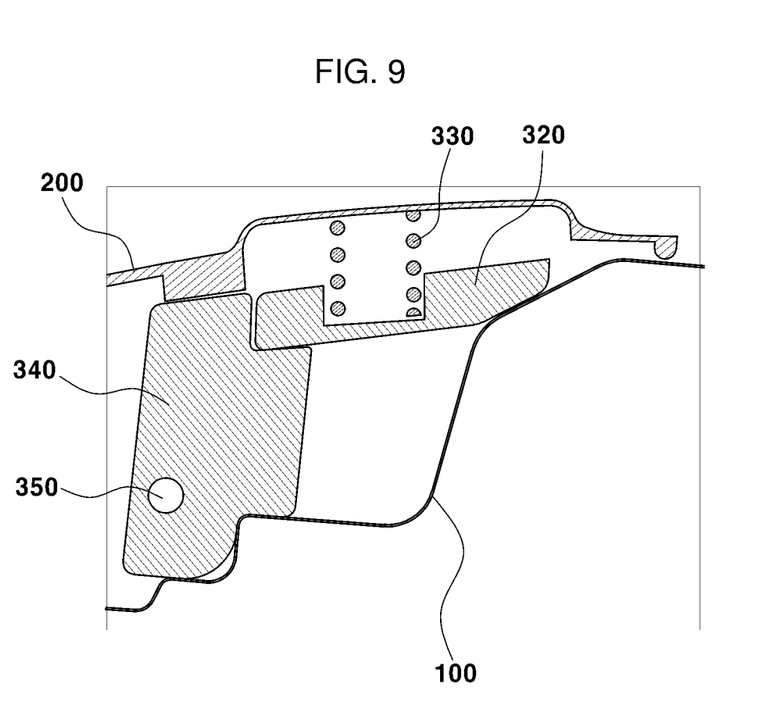
FIG. 9 is a view illustrating a third absorbing member of the boarding/deboarding support structure for a lower door according to another embodiment of the present disclosure when the lower door is in the opened state.
Figure 10:
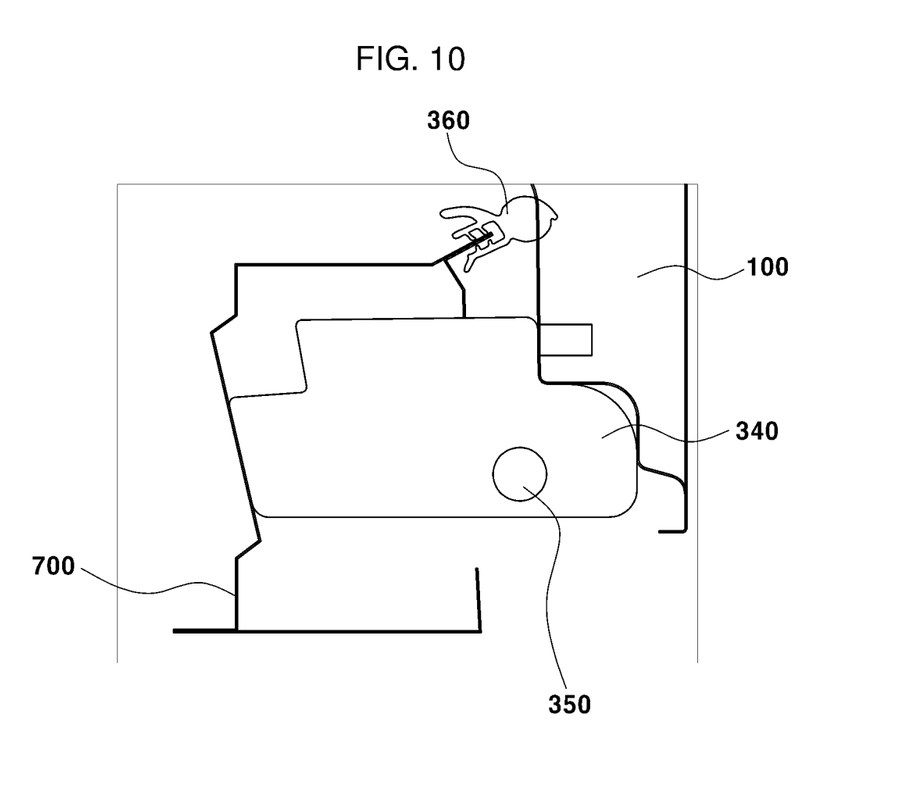
FIG. 10 is a view illustrating the third absorbing member of the boarding/deboarding support structure for a lower door according to another embodiment of the present disclosure when the lower door is in the closed state.

FIG. 9 is a view illustrating the second absorbing member 340 of the boarding/deboarding support structure for a lower door according to another embodiment of the present disclosure when the lower door 100 is in the opened state, and FIG. 10 is a view illustrating the second absorbing member 340 of the boarding/deboarding support structure for a lower door according to another embodiment of the present disclosure when the lower door 100 is in the closed state.

Referring to FIG. 9, when the lower door 100 is in the fully opened state, the first absorbing member 320 may be in contact with the support portion of one end of the second absorbing member 340, and the opposite end of the second absorbing member 340 may be in contact with an inner panel of the lower door 100, thereby supporting a load. When a load is applied through the lower trim 200, the second absorbing member 340 fills the gap between the lower trim 200 and the lower door 100, thereby stably supporting a load. The stiffener beam 350 may support the load transferred to the first absorbing member 320 together with the second absorbing member 340.

Referring to FIG. 10, when the lower door 100 is in the closed state, one end of the second absorbing member 340 may be in contact with the second reinforcing member 700, and the opposite end of the second absorbing member 340 may be in contact with the inner panel of the lower door 100, thereby absorbing a collision.

The lower door 100, which is configured such that the upper end thereof is rotated and opened with respect to the first hinge part 400 connected to the bottom surface of the vehicle body, may be the portion to which impact energy is primarily applied in the event of a collision. In this case, the opposite end of the second absorbing member 340 may have a shape corresponding to the shape of the inner end of the lower door 100, and the second reinforcing member 700 may be configured to contact one end of the second absorbing member 340 such that the second absorbing member 340 absorbs the impact energy applied to the lower door 100 in the event of a collision with an external object. The stiffener beam 350 and the second reinforcing member 700 may be configured to alleviate impact energy together with the second absorbing member 340. More preferably, in the event of a collision of the vehicle, the second absorbing member 340 may primarily absorb collision energy, and the stiffener beam 350 and the second reinforcing member 700 may alleviate collision energy.

Figure 11:
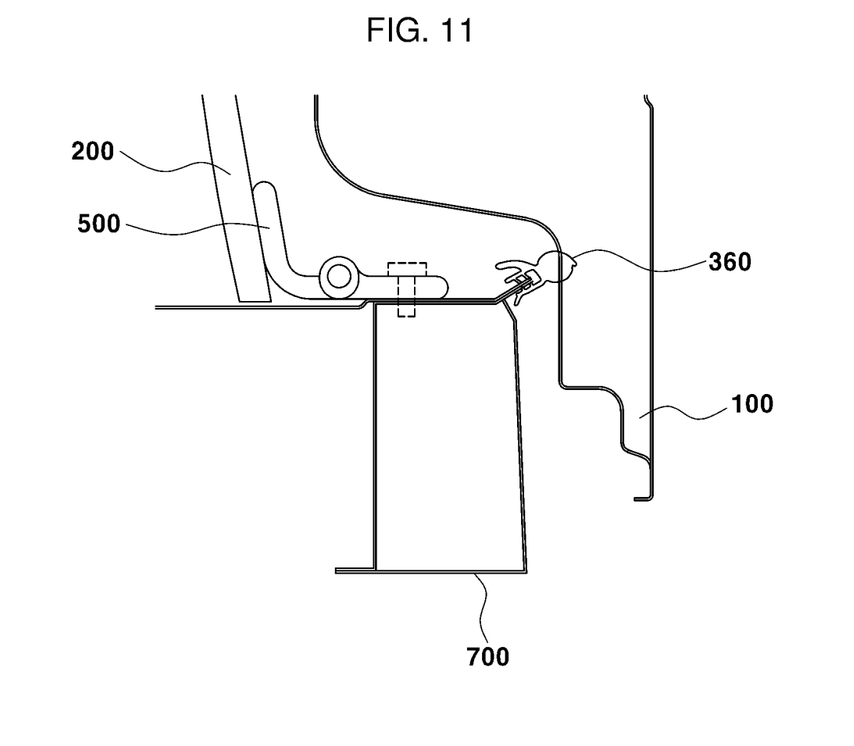
FIG. 11 is a view illustrating a second reinforcing member of the boarding/deboarding support structure for a lower door according to another embodiment of the present disclosure.

FIG. 11 is a view illustrating the second reinforcing member 700 of the boarding/deboarding support structure for a lower door according to another embodiment of the present disclosure.

The second hinge part 500 may be bolted to one surface of the second reinforcing member 700 such that the lower trim 200 is rotated and opened. The second reinforcing member 700 may be provided at one end thereof with the weather strip 360, which is opposite the lower door 100 and supports the lower door 100.

The second reinforcing member 700 may be located adjacent to the second absorbing member 340 in the width direction of the vehicle so as to withstand a collision when the lower door 100 is in the closed state.

In summary, the boarding/deboarding support structure for a lower door according to the present disclosure is configured such that the lower trim 200 is provided inside the lower door 100 and such that an energy-absorbing member is deployed when the lower door 100 is opened, thereby improving the convenience of an occupant and increasing support stability.

As is apparent from the above description, the boarding/deboarding support structure for a lower door according to embodiments of the present disclosure has the following effects.

A lower trim is provided inside a lower door and an energy-absorbing member is deployed when the lower door is opened, thereby improving the convenience of an occupant and increasing support stability.

In addition, the energy-absorbing member operates in conjunction with opening and closing of the lower door due to the elastic force of a torsion spring and a compression spring, thereby effectively absorbing and alleviating impact energy in the event of a collision of the front portion or the rear portion of a vehicle, and consequently preventing damage to the vehicle and ensuring the occupants' safety.

The foregoing detailed description of the present disclosure is merely illustrative. The term "door" used to describe an embodiment of the present disclosure indicates a door that is configured to open in the forward-backward direction of a vehicle. However, the present disclosure is not limited thereto. The foregoing content may also be applied to doors configured to open bilaterally in the width direction of the vehicle. The foregoing content is intended to illustrate and describe exemplary embodiments of the present disclosure, and the present disclosure may be used in various other combinations, modifications, and environments. That is, the present disclosure may be modified or changed within the scope of the concept of the present disclosure disclosed herein, the scope equivalent to the foregoing content, and/or the scope of technology or knowledge known in the art. The embodiments described above are intended to describe the best mode for implementing the technical idea of the present disclosure, and various modifications required for specific applications and uses of the present disclosure are also possible. Thus, the foregoing detailed description is not intended to limit the present disclosure to the disclosed modes. The appended claims should be interpreted as also including other modes.

What is claimed is:

1. A boarding/deboarding support structure comprising:
   a door having an upper end configured to be rotated and opened with respect to a bottom surface of a vehicle body;

a trim located inside the door, the trim having an upper end configured to be rotated and opened with respect to a floor of the vehicle body; and an absorbing member having at least a portion supported by the door and a rear surface of the trim, the absorbing member being configured to absorb energy, wherein the absorbing member comprises a torsion spring having an elastic force;

wherein the trim is designed to be located between the floor of the vehicle body and an inner surface of the door;

wherein the boarding/deboarding support structure is configured so that when the door is in a closed state, the absorbing member is pressed and the torsion spring is compressed; and wherein the boarding/deboarding support structure is configured so that when the door is opened, the absorbing member is deployed to be located between the trim and the door by a restoring force of the torsion spring.

2. The boarding/deboarding support structure of claim 1, wherein:

the door is provided with a first hinge part designed to be connected to the bottom surface of the vehicle body;

the trim is provided with a second hinge part designed to be connected to the floor of the vehicle body; and the second hinge part is formed to be higher than the first hinge part in a height direction of the vehicle body.

3. The boarding/deboarding support structure of claim 2, further comprising a reinforcing member designed to be connected to the floor of the vehicle body, wherein the second hinge part is configured to be connected to the reinforcing member such that the trim is rotated and opened.

4. The boarding/deboarding support structure of claim 1, wherein the boarding/deboarding support structure is configured so that when the door is fully opened, the torsion spring is restored and the absorbing member is deployed such that one end of the absorbing member contacts an inner end of the door.

5. A boarding/deboarding support structure, comprising:

a door having an upper end configured to be rotated and opened with respect to a bottom surface of a vehicle body;

a trim located inside the door, the trim having an upper end configured to be rotated and opened with respect to a floor of the vehicle body, wherein the trim is designed to be located between the floor of the vehicle body and an inner surface of the door;

a first absorbing member having at least a portion supported by the door and a rear surface of the trim, the first absorbing member being configured to absorb energy, wherein the boarding/deboarding support structure is configured so that when the door is opened, the first absorbing member is deployed to be located between the trim and the door; and a compression spring located inside the first absorbing member, wherein the compression spring is configured to be fully compressed to absorb vibration when the door is in a closed state.

6. The boarding/deboarding support structure of claim 5, wherein:

the door is provided with a first hinge part designed to be connected to the bottom surface of the vehicle body;

the trim is provided with a second hinge part designed to be connected to the floor of the vehicle body; and the second hinge part is formed to be higher than the first hinge part in a height direction of the vehicle body.

7. The boarding/deboarding support structure of claim 6, further comprising:

a second absorbing member provided at an inner-lower end of the door to absorb energy; and a reinforcing member located adjacent to the second absorbing member in a width direction of the vehicle body, wherein the boarding/deboarding support structure is configured so that when the door is opened, the second absorbing member is rotated integrally therewith.

8. The boarding/deboarding support structure of claim 7, further comprising a stiffener beam configured to penetrate the second absorbing member, wherein the second hinge part is connected to the reinforcing member such that the trim can be rotated and opened.

9. The boarding/deboarding support structure of claim 8, wherein the stiffener beam is configured to withstand a load and collision energy transferred to the second absorbing member.

10. The boarding/deboarding support structure of claim 7, wherein the boarding/deboarding support structure is configured so that when the door is in a fully opened state, the compression spring is restored, one end of the first absorbing member is in contact with an inner end of the door, and an opposite end of the first absorbing member is in contact with a support portion of the second absorbing member.

11. The boarding/deboarding support structure of claim 7, wherein the boarding/deboarding support structure is configured so that when the door is in a closed state, one end of the second absorbing member is in contact with the reinforcing member, and an opposite end of the second absorbing member is in contact with an inner panel of the door to absorb a collision.

12. The boarding/deboarding support structure of claim 7, wherein the boarding/deboarding support structure is configured so that when the door is in a fully opened state, the first absorbing member is in contact with a support portion of one end of the second absorbing member, and an opposite end of the second absorbing member is in contact with an inner panel of the door to support a load.

13. The boarding/deboarding support structure of claim 7, wherein the boarding/deboarding support structure is configured so that when the door is opened, the second absorbing member is deployed by restoring force of the compression spring.

14. The boarding/deboarding support structure of claim 5, wherein the compression spring is configured to be fully compressed to absorb vibration when the door is in a closed state.

15. A vehicle comprising:

a vehicle body;

a upper door adjacent to a roof of the vehicle body;

a lower door adjacent to the upper door, the lower door having an upper end configured to be rotated and opened with respect to a bottom surface of the vehicle body;

a trim located inside the lower door between a floor of the vehicle body and an inner surface of the lower door, the trim having an upper end configured to be rotated and opened with respect to the floor of the vehicle body; and an energy absorbing member having at least a portion supported by the lower door and a rear surface of the trim, the energy absorbing member comprising a torsion spring having an elastic force;

wherein, when the lower door is opened, the energy absorbing member is deployed to be located between the trim and the lower door, wherein the energy absorbing member is configured to be pressed when the lower door is in a closed state;

wherein the torsion spring is configured to be compressed when the lower door is in a closed state; and wherein the energy absorbing member is configured to be deployed by a restoring force of the torsion spring when the lower door is opened; and when the lower door is fully opened, the torsion spring is restored and the energy absorbing member is deployed such that one end of the energy absorbing member contacts an inner end of the lower door.

16. The vehicle of claim 15, wherein:

the lower door is provided with a first hinge part connected to the bottom surface of the vehicle body;

the trim is provided with a second hinge part connected to the floor of the vehicle body; and the second hinge part is formed to be higher than the first hinge part in a height direction of the vehicle body.

17. The vehicle of claim 16, further comprising a reinforcing member connected to the floor of the vehicle body, wherein the second hinge part is configured to be connected to the reinforcing member such that the trim is rotated and opened.

18. The vehicle of claim 15, wherein the torsion spring is configured to be restored and the energy absorbing member is configured to be deployed such that one end of the energy absorbing member contacts an inner end of the lower door when the lower door is fully opened.

19. The boarding/deboarding support structure of claim 1, wherein the door comprises a lower door relative to an upper door that is adjacent to a roof of the vehicle body.

20. The boarding/deboarding support structure of claim 5, wherein the door comprises a lower door relative to an upper door that is adjacent to a roof of the vehicle body.

\* \* \* \* \*